United States Patent
Tai et al.

(10) Patent No.: US 9,808,830 B2
(45) Date of Patent: Nov. 7, 2017

(54) ULTRASOUND TRANSDUCER AND ULTRASOUND IMAGING SYSTEM WITH A VARIABLE THICKNESS DEMATCHING LAYER

(71) Applicant: General Electric Company, Schenectady, NY (US)

(72) Inventors: Alan Tai, Phoenix, AZ (US); Frederic Lanteri, Le Cannet (FR); Scott Easterbrook, Bainbridge Island, WA (US); Jian Zhong Zhao, San Jose, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 527 days.

(21) Appl. No.: 14/625,665

(22) Filed: Feb. 19, 2015

(65) Prior Publication Data
US 2015/0183000 A1    Jul. 2, 2015

Related U.S. Application Data

(63) Continuation-in-part of application No. 14/141,603, filed on Dec. 27, 2013, now Pat. No. 9,452,447.

(51) Int. Cl.
*B06B 1/06* (2006.01)
*G01S 7/52* (2006.01)

(52) U.S. Cl.
CPC ........ *B06B 1/0622* (2013.01); *G01S 7/52017* (2013.01)

(58) Field of Classification Search
CPC .............................. B06B 1/0622; G10K 11/02
See application file for complete search history.

(56) References Cited

U.S. PATENT DOCUMENTS

| | | | | |
|---|---|---|---|---|
| 4,184,094 A * | 1/1980 | Kopel | ...................... | G10K 11/02 310/327 |
| 4,205,686 A * | 6/1980 | Harris | .................. | A61B 8/4281 310/336 |
| 4,350,917 A * | 9/1982 | Lizzi | ...................... | B06B 1/0644 310/320 |
| 5,792,058 A * | 8/1998 | Lee | ........................ | B06B 1/0622 600/459 |
| 6,194,814 B1* | 2/2001 | Hanafy | ................. | G10K 11/006 310/327 |

(Continued)

FOREIGN PATENT DOCUMENTS

| | | | | |
|---|---|---|---|---|
| DE | 904955 C | * | 2/1954 | ........... B06B 1/0685 |
| JP | 2003299196 A | * | 10/2003 | ........... B06B 1/0622 |

(Continued)

OTHER PUBLICATIONS

International Search Report and Written Opinion from corresponding PCT application No. PCT/US2014/049214 dated Dec. 4, 2014; 9 pages.

*Primary Examiner* — J. San Martin

(57) ABSTRACT

An ultrasound transducer and an ultrasound imaging system including an acoustic layer with a plurality of transducer elements and a dematching layer coupled to the acoustic layer. The dematching layer has an acoustic impedance greater than the acoustic layer and the dematching layer has a thickness that varies in order to alter a bandwidth of the ultrasound probe.

20 Claims, 8 Drawing Sheets

(56) References Cited

U.S. PATENT DOCUMENTS

| | | | |
|---|---|---|---|
| 7,850,613 B2 * | 12/2010 | Stribling | A61B 8/0825 |
| | | | 128/915 |
| 2003/0189391 A1 * | 10/2003 | Shimizu | B06B 1/0622 |
| | | | 310/334 |
| 2009/0069691 A1 * | 3/2009 | Saito | B06B 1/0622 |
| | | | 600/459 |
| 2009/0072668 A1 * | 3/2009 | Gelly | G10K 11/02 |
| | | | 310/334 |
| 2012/0013218 A1 * | 1/2012 | Huang | H03H 3/0072 |
| | | | 310/300 |
| 2013/0257224 A1 | 10/2013 | Wodnicki et al. | |
| 2015/0115773 A1 * | 4/2015 | Li | B06B 1/0677 |
| | | | 310/335 |
| 2016/0185056 A1 * | 6/2016 | Beacham | B29D 11/0099 |
| | | | 264/2.7 |
| 2016/0278737 A1 * | 9/2016 | Fujimura | A61B 1/018 |
| 2016/0296975 A1 * | 10/2016 | Lukacs | A61B 8/12 |
| 2017/0014866 A1 * | 1/2017 | Liu | G01N 29/2456 |
| 2017/0065253 A1 * | 3/2017 | Li | H01L 41/312 |

FOREIGN PATENT DOCUMENTS

| | | | | |
|---|---|---|---|---|
| JP | 2013160685 A | * | 8/2013 | |
| WO | WO 2005104210 A2 | * | 11/2005 | B06B 1/0622 |
| WO | 2013116258 A1 | | 8/2013 | |
| WO | WO 2013116258 A1 | * | 8/2013 | E21B 47/101 |

* cited by examiner

| | Transducer with control dematching layer | Transducer with shaped dematching layer |
|---|---|---|
| Loop gain | -55.2 dB | -54.2 dB |
| Bandwidth | 93.6 % | 112 % |
| Center frequency | 2.63 MHz | 2.89 MHz |
| FL6 | 1.4 MHz | 1.27 MHz |
| FH6 | 3.86 MHz | 4.52 MHz |
| FL20 | 1.08 MHz | 0.997 MHz |
| FH20 | 4.32 MHz | 4.96 MHz |
| PW6 | 0.469 μSec | 0.364 μSec |
| PW20 | 2.02 μSec | 1.37 μSec |
| PW30 | 3.37 μSec | 3.43 μSec |

ULTRASOUND TRANSDUCER AND ULTRASOUND IMAGING SYSTEM WITH A VARIABLE THICKNESS DEMATCHING LAYER

CROSS REFERENCE TO RELATED APPLICATIONS

This application is a continuation in part of U.S. patent application Ser. No. 14/141,603 filed Dec. 27, 2013. The application is incorporated herein by reference.

FIELD OF THE INVENTION

This disclosure relates generally to an ultrasound transducer and an ultrasound imaging system including an acoustic layer including a plurality of transducer elements. The transducer and ultrasound imaging system include a dematching layer having a thickness that varies in order to alter a bandwidth of the ultrasound transducer.

BACKGROUND OF THE INVENTION

It is known for conventional ultrasound transducers to include a dematching layer on the backside of an acoustic layer including one or more transducer elements. The dematching layer typically includes a material with a higher acoustic impedance than the acoustic layer. Using a dematching layer enables the ultrasound transducer to use a thinner acoustic layer to achieve the same resonant frequency as would be realized using a thicker acoustic layer. Using a thinner acoustic layer enables the acoustic layer to have a better electrical impedance match with the imaging system and helps to improve the sensitivity needed for a transducer of a given frequency.

It is generally desirable to design ultrasonic transducers to have as broad of an overall bandwidth as possible. One known way to achieve a broader bandwidth involves machining the active acoustic layer, typically piezoceramic (PZT), piezoelectric single crystal (e.g. PMN-PT or PIN-PMN-PT), or piezocomposite made from piezoelectric materials, to have multiple thicknesses. Regions where the piezoelectric material is thicker will have a lower frequency response and regions where the piezoelectric material is thinner will have a higher frequency response. Machining a piezoelectric material to have different frequency responses will result in an ultrasound transducer with a larger overall bandwidth. However, piezoelectric materials, such as lead zirconate titanate (PZT) or piezoelectric single crystal are difficult and expensive to manufacture with multiple different thicknesses at the tolerances required in an ultrasound transducer.

Therefore, for these and other reasons, there is a need for an improved ultrasound transducer and ultrasound imaging system with improved bandwidth.

BRIEF SUMMARY OF THE INVENTION

Embodiments of the present technology generally relate to ultrasound transducers and methods of making ultrasound transducers.

In an embodiment, an ultrasound transducer includes an acoustic layer including a plurality of transducer elements, a dematching layer coupled to the acoustic layer, the dematching layer comprising a front side adjacent to the acoustic layer and a backside opposite of the acoustic layer. The dematching layer has a greater acoustic impedance than the acoustic layer. The dematching layer has a thickness that varies in order to alter a bandwidth of the ultrasound transducer. The front side of the dematching layer defines a curved surface.

In an embodiment, an ultrasound imaging system includes an ultrasound transducer for transmitting and receiving ultrasound signals. The ultrasound transducer includes an acoustic layer including a plurality of transducer elements, a dematching layer coupled to the acoustic layer, the dematching layer including a front side and a backside. The dematching layer having a greater acoustic impedance than the acoustic layer. The dematching layer having a thickness that varies in order to alter a bandwidth of the ultrasound transducer. The front side of the dematching layer defines a curved surface.

DETAILED DESCRIPTION OF THE INVENTION

Figure 1:
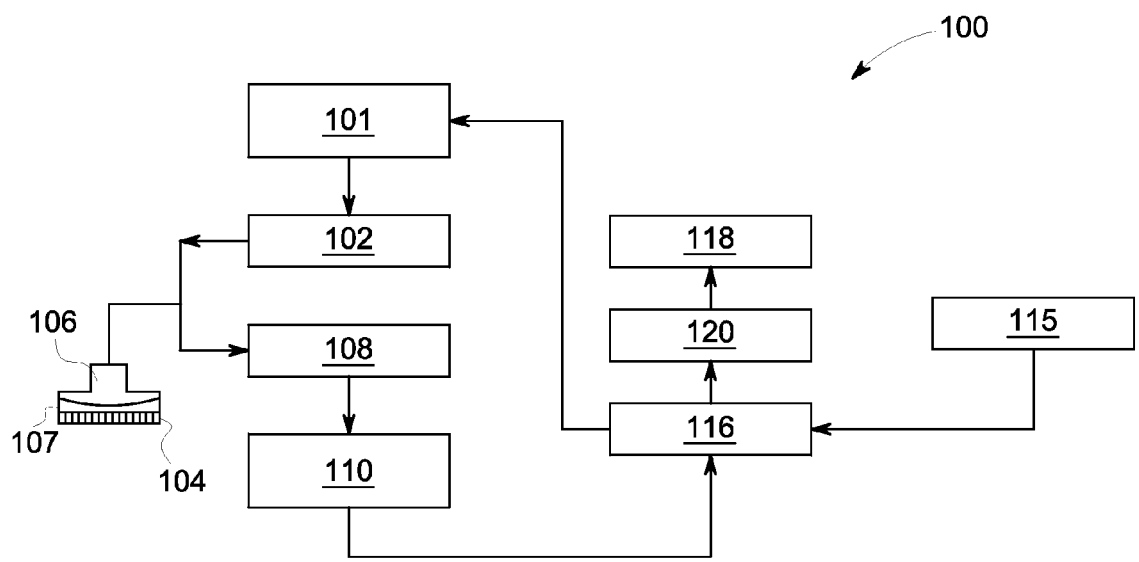
FIG. 1 is a schematic diagram of an ultrasound imaging system in accordance with an embodiment.

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Embodiments of the present technology generally relate to ultrasound transducers and ultrasound imaging systems with improved bandwidth. In the drawings, like elements are identified with like identifiers.

FIG. 1 is a schematic diagram of an ultrasound imaging system 100 in accordance with an embodiment. The ultrasound imaging system 100 includes a transmit beamformer 101 and a transmitter 102 that drive transducer elements 104 within a transducer 106 to emit pulsed ultrasonic signals into a body (not shown). The transducer elements are configured to both transmit and receive ultrasound signals. The transducer 106 may be a 1D transducer, a 1.25D transducer, a 1.5D transducer, a 1.75D transducer, a 2D transducer, or any other type of ultrasound transducer. Additionally, the transducer 106 may be a linear transducer or a curved transducer depending upon the embodiment. The transducer 106 includes a dematching layer 107 of varying thickness. The dematching layer 107 will be described in more detail hereinafter. The pulsed ultrasonic signals are back-scattered from structures in the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. According to some embodiments, the transducer 106 may contain electronic circuitry to do all or part of the transmit and/or the receive beamforming. For example, all or part of the transmit beamformer 101, the transmitter 102, the receiver 108 and the receive beamformer 110 may be situated within the transducer 106 according to an embodiment. The terms "scan" or "scanning" may also be used in this disclosure to refer to acquiring data through the process of transmitting and receiving ultrasonic signals. The terms "data" or "ultrasound data" may be used in this disclosure to refer to either one or more datasets acquired with an ultrasound imaging system. A user interface 115 may be used to control operation of the ultrasound imaging system 100, including the input of patient data and/or the selection of scanning or display parameters.

The ultrasound imaging system 100 also includes a processor 116 to control the transmit beamformer 101, the transmitter 102, the receiver 108, and the receive beamformer 110. The processor is in electronic communication with the transmit beamformer 101, the transmitter 102, the receiver 108, and the receive beamformer 110. The processor 116 is also in electronic communication with the transducer 106. The processor 116 may control the transducer 106 to acquire data. The processor 116 controls which of the elements 104 are active and the shape of a beam emitted from the transducer 106. The processor 116 is also in electronic communication with a display device 118, and the processor 116 may process the data into images for display on the display device 118. For purposes of this disclosure, the term "electronic communication" may be defined to include both wired and wireless connections. The processor 116 may include a central processor (CPU) according to an embodiment. According to other embodiments, the processor 116 may include other electronic components capable of carrying out processing functions, such as a digital signal processor, a field-programmable gate array (FPGA) or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment the demodulation may be carried out earlier in the processing chain. The processor 116 may be adapted to perform one or more processing operations on the data according to a plurality of selectable ultrasound modalities. The data may be processed in real-time during a scanning session as the echo signals are received. For the purposes of this disclosure, the term "real-time" is defined to include a procedure that is performed without any intentional delay. For example, an embodiment may acquire and display data a real-time frame-rate of 7-20 frames/sec. For purposes of this disclosure, the term "frame-rate" may be applied to either 2D or 3D frames of ultrasound data. Additionally, the term "volume-rate" may be used to refer to the frame-rate when applied to 4D ultrasound data. It should be understood that the real-time frame rate may be dependent on the length of time that it takes to acquire each volume of data. For a volume acquisition, frame rate depends on the length of time required to acquire each volume of data. Accordingly, when acquiring a relatively large volume of data, the real-time volume-rate may be slower. Thus, some embodiments may have real-time volume-rates that are considerably faster than 20 volumes/sec while other embodiments may have real-time volume-rates slower than 7 volumes/sec. The data may be stored temporarily in a buffer (not shown) during a scanning session and processed in less than real-time in a live or off-line operation. Some embodiments of the invention may include multiple processors (not shown) to handle the processing tasks. For example, a first processor may be utilized to demodulate and decimate the RF signal while a second processor may be used to further process the data prior to displaying an image. It should be appreciated that other embodiments may use a different arrangement of processors.

The ultrasound imaging system 100 may continuously acquire data at a volume-rate of, for example, 10 Hz to 30 Hz. Images generated from the data may be refreshed at a similar rate. Other embodiments may acquire and display data at different rates. For example, some embodiments may acquire data at a rate of less than 10 Hz or greater than 30 Hz depending on the size of the volume and the intended application. A memory 120 is included for storing processed frames of acquired data. In an exemplary embodiment, the memory 120 is of sufficient capacity to store at least several seconds worth of frames of ultrasound data. The frames of data are stored in a manner to facilitate retrieval thereof according to its order or time of acquisition. The memory 120 may comprise any known data storage medium.

Optionally, embodiments of the present invention may be implemented utilizing contrast agents. Contrast imaging generates enhanced images of anatomical structures and blood flow in a body when using ultrasound contrast agents including microbubbles. After acquiring data while using a contrast agent, the image analysis includes separating harmonic and linear components, enhancing the harmonic component and generating an ultrasound image by utilizing the enhanced harmonic component. Separation of harmonic components from the received signals is performed using suitable filters. The use of contrast agents for ultrasound imaging is well-known by those skilled in the art and will therefore not be described in further detail.

In various embodiments of the present invention, data may be processed by other or different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate and combinations thereof, and the like. The image beams and/or frames are stored and timing information indicating a time at which the data was acquired in memory may be recorded. The modules may include, for example, a scan conversion module to perform scan conversion operations to convert the image frames from beam space coordinates to display space coordinates. A video processor module may be provided that reads the image frames from a memory and displays the image frames in real-time while a procedure is being carried out on a patient. A video processor module may store the image frames in an image memory, from which the images are read and displayed.

Figure 2:
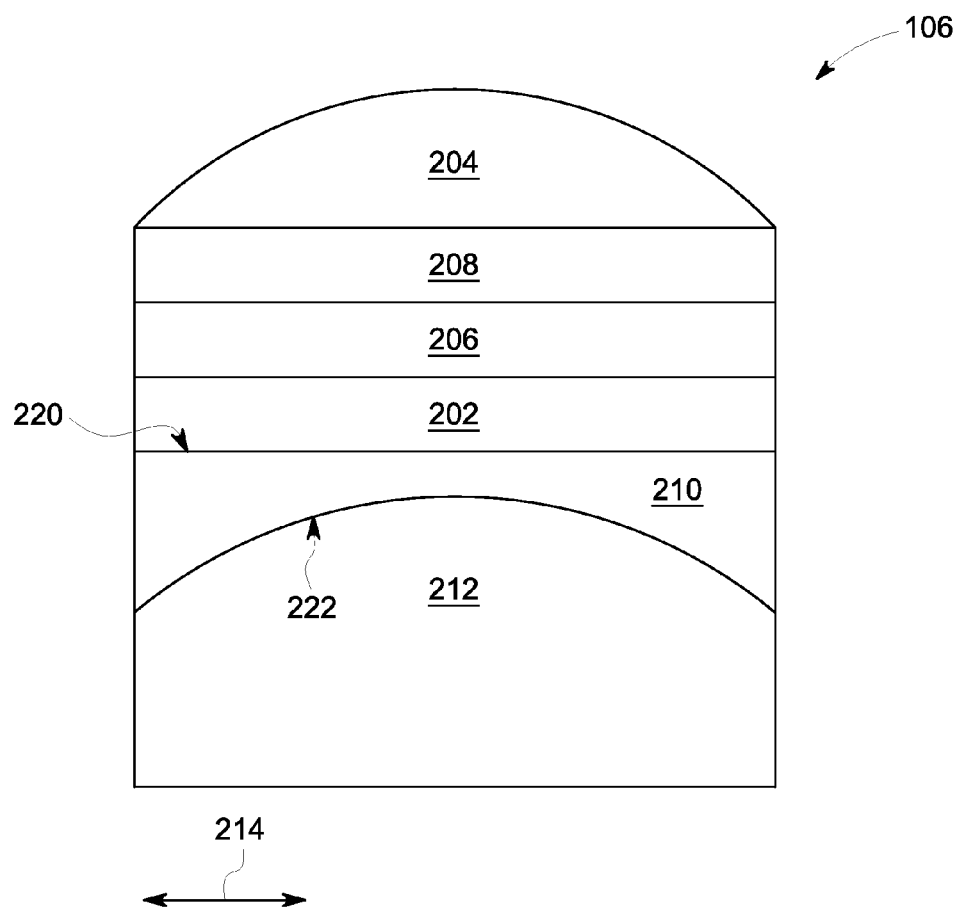
FIG. 2 is a schematic representation of a sectional view of an ultrasound transducer in accordance with an embodiment.

FIG. 2 is a schematic representation of a sectional view of the ultrasound transducer 106 (shown in FIG. 1) in accordance with an embodiment. Transducer 106 includes an acoustic layer 202, which may include a plurality of transducer elements. According to an embodiment, the transducer elements may be a piezoelectric material such as lead zirconate titanate piezoceramic (PZT) or piezoelectric single crystal, such as, for example, PMN-PT or PIN-PMN-PT. According to the embodiment shown in FIG. 2, the acoustic elements may be arranged in a linear array. However, according to other embodiments, the transducer elements may be arranged in different configurations including a 2D array, such as in an E4D transducer. Transducer 106 includes a lens 204, a first matching layer 206, a second matching layer 208, a dematching layer 210, and a base 212. The first matching layer 206 and the second matching layer 208 are disposed between the acoustic layer 202 and the lens 204. The first matching layer 206 is coupled to the acoustic layer 202 and the second matching layer 208. The second matching layer 208 is coupled to the first matching layer 206 and the lens 204. The dematching layer 210 is coupled to the acoustic layer 202 on the opposite side as the matching layers and the lens 204. According to an embodiment, the components shown in FIG. 2 may be coupled together with epoxy or another adhesive. As such, there may be a very thin layer of epoxy or another adhesive between the layers represented in FIG. 2.

According to an embodiment, the acoustic layer may include PZT piezoceramic or piezoelectric single crystal (e.g. PMN-PT or PIN-PMN-PT). These materials have a relatively high acoustic impedance of about 30 MRayl. Or the acoustic layer may be a piezocomposite layer including a piezoelectric material. However, in order to maximize the transmission of acoustic energy into the tissue, matching layers 206, 208 are disposed between the lens 204 and the acoustic layer 202. The matching layers 206, 208 are selected to minimize the amount of acoustic energy that is reflected back from boundaries between layers with different acoustic impedances in the transducer 106. Each of the matching layers may include: a metal, such as copper, copper alloy, copper with graphite pattern embedded therein, magnesium, magnesium alloy, aluminum, aluminum alloy; filled epoxy; glass ceramic; composite ceramic; and/or macor, for example. The matching section may incorporate matching layers made from a combination of materials including a mass layer and a spring layer as described in the following references, which are incorporated herein by reference: published U.S. patent application US20100237746 A1, published U.S. patent application US20120157853 A1, and granted U.S. Pat. No. 7,905,007 B2. The lens 204 may be rubber or any other material with a different speed of sound than the tissue being imaged with the ultrasound. The lens 204 is adapted to shape and focus the ultrasound beam emitted from the acoustic layer 202. The material used to form the lens 204 may be selected to closely match the acoustic impedance of the human body. Matching layers 206, 208 provide a combined distance of x between lens 204 and acoustic layer 202, where the distance x is about ¼ to ½ of the desired wavelength of transmitted ultrasound waves at the resonant frequency.

The dematching layer 210 includes a front side 220 adjacent to the acoustic layer 202 and a backside 222 opposite of the acoustic layer 202. The front side 220 defines a surface that is a uniform distance from the acoustic layer 202. The front side 220 defines a flat surface according to the embodiment shown in FIG. 2. However, the dematching layer 210 is shaped so that the backside 222 defines a concave surface. FIG. 2 is a cross-sectional view of the transducer 106 along a width direction 214. The width direction 214 will be described in additional detail with respect to FIG. 3. The thickness of the dematching layer 210 varies according to a curve in the width direction 214 according to the embodiment shown in FIG. 2.

Figures 3, 4:
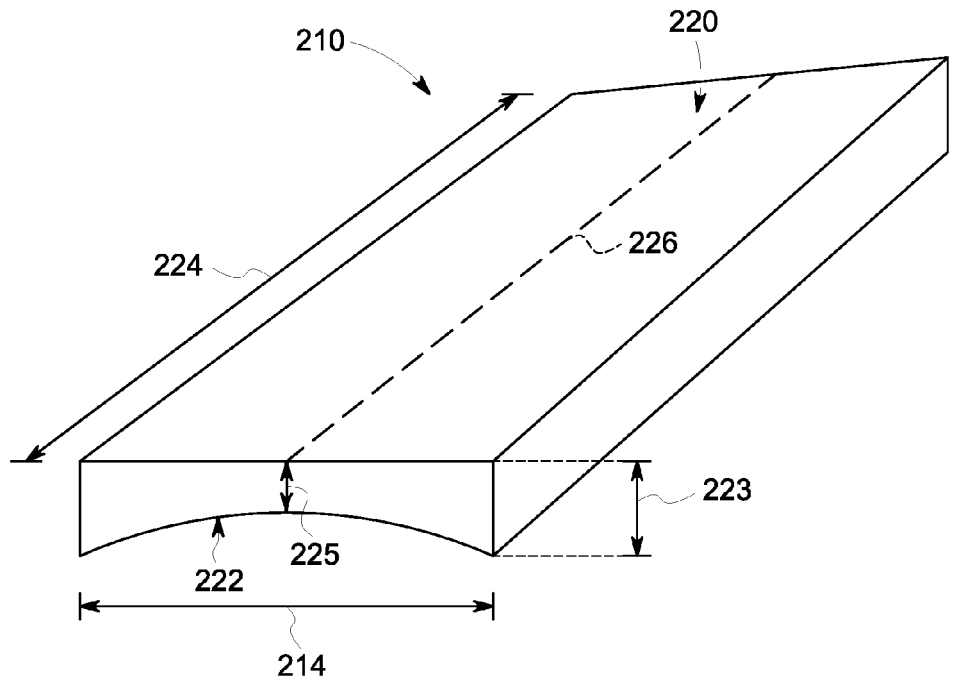
FIG. 3 is a schematic representation of a perspective view of a dematching layer in accordance with an embodiment.
FIG. 4 is a chart showing experimental results of two transducers with different dematching layers.

FIG. 3 is a schematic representation of a perspective view of the dematching layer 210 from FIG. 2 in accordance with an embodiment. The dematching layer 210 includes a length direction 224 and the width direction 214. As is visible in FIG. 3, the dematching layer 220 is longer in the length direction 224 than the width direction 214. The front side 220 and the backside 222 are also represented in FIG. 3. The front side 220 defines a flat surface. The dematching layer 210 is shaped so that the backside 222 defines a concave surface. According to an embodiment, the dematching layer 210 is a shape with a constant cross-section in the width direction 214. Dimensions of the dematching layer 210 will be described in accordance with an exemplary embodiment. According to an embodiment, the dematching layer 210 is part of a transducer 106 (shown in FIG. 2) where the acoustic layer is configured as a linear array. The elements of the linear array are arranged along the length direction 224. The dematching layer 210 is formed from a material with a higher acoustic impedance compared to the acoustic layer 202 (shown in FIG. 2). The dematching layer 202, may be, for example, tungsten carbide, which has an acoustic impedance of about 100 MRayl. The dematching layer 202 could be made from any other material with an acoustic impedance that is significantly higher than that of the acoustic layer 202. According to an exemplary embodiment, the dematching layer 202, may be sintered from a powder into a rough shape and then machined into a final shape with more precise dimensions. For example, the dematching layer 210 may be sintered into a generally flat layer and then the shape and dimensions of the backside surface may be finalized during a machining step. According to an exemplary embodiment, the dematching layer 210 may be 28 mm in the length direction 224, and 15 mm in the width direction 214. The dematching layer 210 may be 0.31 mm in thickness at an edge, as indicated by an edge thickness 223, and 0.15 mm at a center, as indicated by a center thickness 225. A centerline 226 is represented by a dashed line on FIG. 3. The centerline 226 is in the middle of the dematching layer 210 in the width direction 214. For purposes of this disclosure the term "center" will be defined to include locations along the centerline of the dematching layer 210. According to an embodiment, the dematching layer 210 is shaped so that the backside 222 defines a concave surface. The concave surface of the embodiment shown in FIG. 3 has a constant radius of curvature of 17.8 cm. A concave surface with a radius of curvature from 10-50 cm should be well-suited for the most common transducer dimensions. However, it should be appreciated that other embodiments may have concave surfaces with a different radius of curvature and/or that are otherwise shaped different. For example, other embodiments may include a dematching layer with a concave surface with a variable radius of curvature. That is, the cross-section of the dematching layer in the width direction 214 may include a backside with a complex curve including multiple different radii of curvature.

FIG. 4 is a chart 400 showing experimental results comparing a transducer with the dematching layer shown in FIG. 3 (listed as a "transducer with a shaped dematching layer") to a transducer with a control dematching layer of constant thickness (listed as a "transducer with control dematching layer"). The dimensions of the dematching layer shown in FIG. 3 have already been described in detail. The control dematching layer is the same length and width, but has a constant thickness. More specifically, the control dematching layer is 28 mm in the length direction, 15 mm in the width direction, and 0.31 mm in thickness.

Referring now to FIGS. 2, 3, and 4, the chart 400 includes data from a transducer with a control dematching layer and data from a transducer with a shaped dematching layer. The transducer with the shaped dematching layer is the transducer described with respect to FIGS. 2 and 3. It is a linear phased array transducer and includes a dematching layer with the dimensions described with respect to FIG. 3. The transducer with the control dematching layer is a linear phased array transducer that is identical to the transducer with the shaped dematching layer except that the dematching layer is of a constant thickness of 0.31 mm.

The bandwidth of the transducer is measured as a percentage of the center frequency. In the chart, FL6 is the 6 dB low frequency; FH6 is the 6 dB high frequency; FL20 is the 20 dB low frequency; FH20 is the 20 dB high frequency; PW6 is the 6 dB pulse width; PW20 is the 20 dB pulse width; and PW30 is the 30 dB pulse width.

The transducer with the control dematching layer has a 6 dB bandwidth of 93.6% of the center frequency, whereas the transducer with the shaped dematching layer has a 6 dB bandwidth of 112% of the center frequency. Therefore, with no changes other than a dematching layer of variable thickness, it is possible to produce a transducer with 18.4% more bandwidth. The transducer with a control dematching layer has a −20 dB bandwidth of 123% of the center frequency while the transducer with a shaped dematching layer has a bandwidth that is 137% of the center frequency. The transducer with the shaped dematching layer therefore shows an improvement of greater than 11% for the −20 dB bandwidth. Manufacturing a dematching layer of variable thickness is an effective way to gain additional bandwidth from a transducer. It is easier and more cost effective than machining an array of piezoelectric transducers to create an acoustic layer with different thicknesses.

Figure 5:
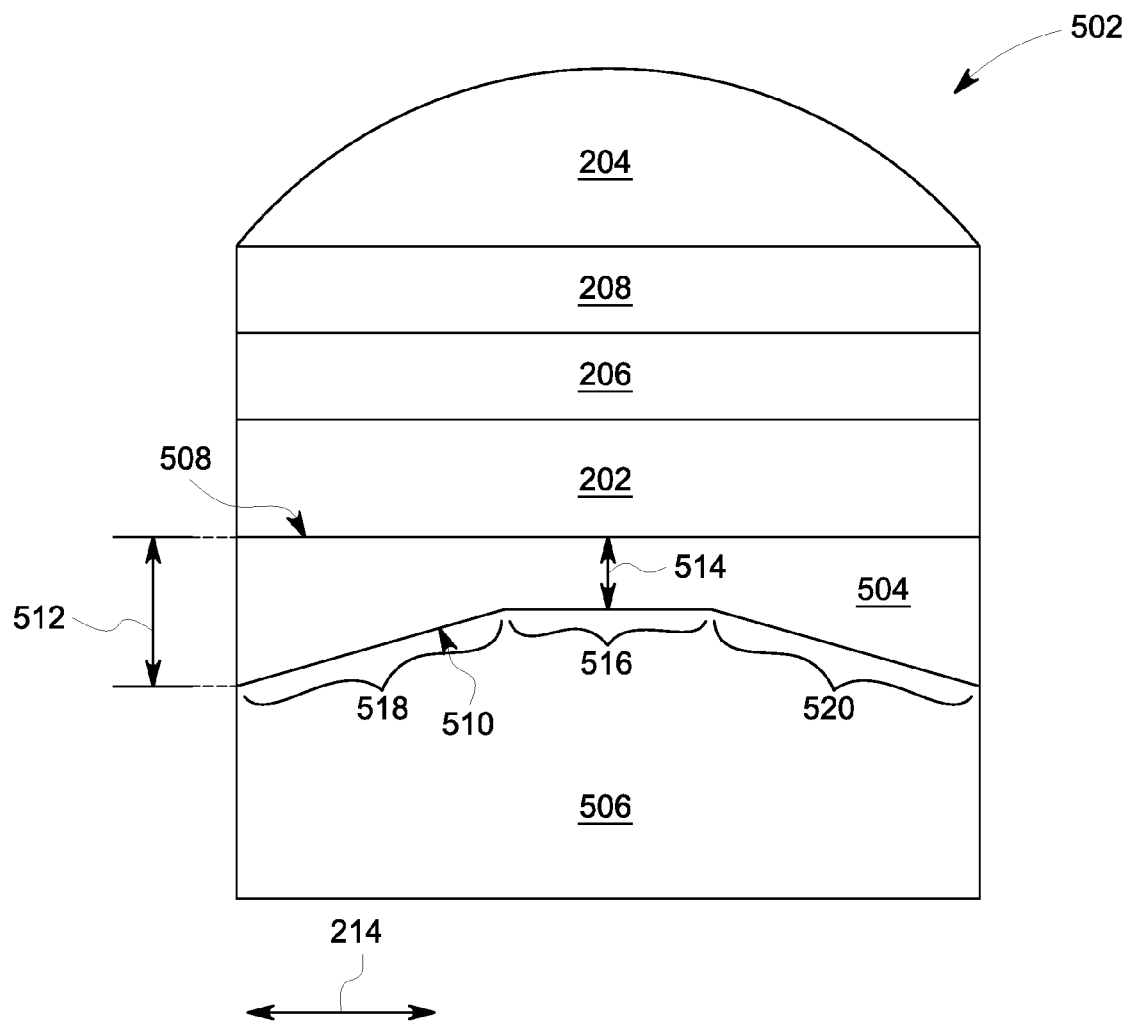
FIG. 5 is a schematic representation of a sectional view of an ultrasound transducer in accordance with an embodiment.

FIG. 5 is a schematic representation of a sectional view of an ultrasound transducer 502 in accordance with an embodiment. Common reference numbers are used to identify identical components that were previously described with respect to FIGS. 2 and 3. The ultrasound transducer 502 includes a dematching layer 504 and a base 506. The dematching layer 504 is shaped to define a front side 508 facing the lens 204 and a backside 510 opposite of the lens 204. According to the embodiment shown in FIG. 5, the dematching layer 504 is shaped so that the front side 508 defines a surface that is a uniform distance from the acoustic layer 202 while the backside 510 defines a concave surface. The front side 508 defines a flat surface according to the exemplary embodiment shown in FIG. 5 because the acoustic layer 202 is flat. According to other embodiments, where the acoustic layer is curved, such as in a curved array probe, a dematching layer may be shaped so that the front side defines a curved surface matching the curvature of the acoustic layer. For an embodiment where the acoustic layer is curved, the thickness of the dematching layer will measured in a direction normal to the acoustic layer. The dematching layer 504 is shaped to define a recessed channel. The recessed channel is defined since the dematching layer 504 has a thickness that is greater at an edge, as indicated by edge thickness 512, than at a center, as indicated by center thickness 514. The center thickness is obtained at a location in the middle of the dematching layer 504 in the width direction 214. The edge thickness is obtained at a location of the dematching layer that is furthest from the center in the width direction 214. Just like the example described with respect to FIG. 2, the transducer 502 has a length direction that is greater than the width direction 214. The length direction is not visible in FIG. 5. When viewed in cross-section as in FIG. 5, the dematching layer 504 includes a first portion 516 that is a uniform thickness. The dematching layer 504 also includes a second portion 518 that defines a surface at a first fixed angle and a third portion 520 that defines a surface at a second fixed angle. The thickness of the dematching layer varies in a linear manner along the width direction 214 in both the first portion 516 and the second portion 518. The embodiment shown in FIG. 5 is just one exemplary embodiment. According to other embodiments, the surfaces may be disposed at different angles with respect to each other, and other embodiments may include a different number of surfaces.

Figure 6:
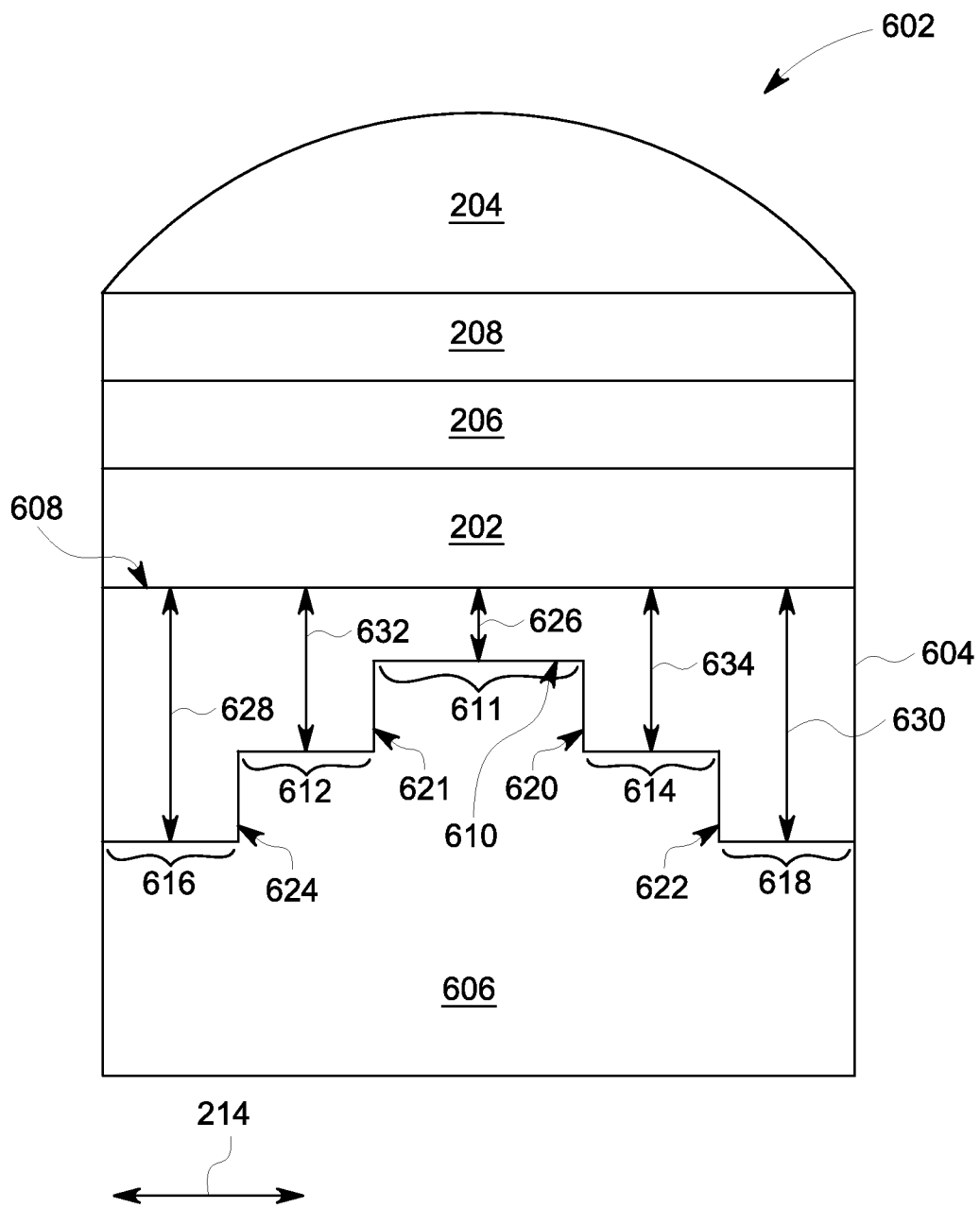
FIG. 6 is a schematic representation of a sectional view of an ultrasound transducer in accordance with an embodiment.

FIG. 6 is a schematic representation of a sectional view of an ultrasound transducer 602 in accordance with an embodiment. Common reference numbers are used to identify identical components that were previously described with respect to FIGS. 2, 3, and 5. The ultrasound transducer 602 includes a dematching layer 604 and a base 606. The dematching layer 604 is shaped to define a front side 608 facing the lens 204 and a backside 610 opposite of the lens 204. According to the embodiment shown in FIG. 5, the dematching layer 604 is shaped so that the front side 508 defines a flat surface and the backside 510 defines multiple surfaces. The dematching layer 604 is shaped to define a plurality of regions with different thicknesses. The dematching layer 604 defines a first region 611, a second region 612, a third region 614, a fourth region 616, and a fifth region 618. FIG. 6 is a cross-sectional view. As such, it should be appreciated that each of the regions indicated in FIG. 6 represents a 2D surface extending in a length direction (not shown). The first region 611 is connected to the second region 612 by a first transition region 621. The third region 614 is connected to the first region 611 by a second transition region 620. The fourth region 616 is connected to the second region 612 by a third transition region 624. The fifth region 618 is connected to the third region 614 by a fourth transition region 622. FIG. 6 represents a sectional view of the transducer 602. In an embodiment, the dematching layer 604 may be constant in cross-section in the width direction 214. Accordingly, each of the regions indicated in FIG. 6 may represent a 2D surface. The dematching layer 604 is shaped so that it is thinner in a center than at an edge in the width direction 214. The thickness at the center is indicated by center thickness 626, while the thickness at the edges is indicated by edge thicknesses 628 and 630. The dematching layer 604 also includes two regions of intermediate thickness. The second region 612 and the third region 614 have thicknesses indicated by thicknesses 632 and 634 respectively. According to the embodiment shown in FIG. 6, the thickness of the dematching layer 604 varies according to a step function. That is, the thickness of the dematching layer 604 changes abruptly at each of the transition regions across the width direction 214. It should be appreciated that the thickness of the dematching layer may vary according to other step functions in accordance with other embodiments. For example, other embodiments may have a different number of discrete steps or regions of uniform thickness.

Figure 7:
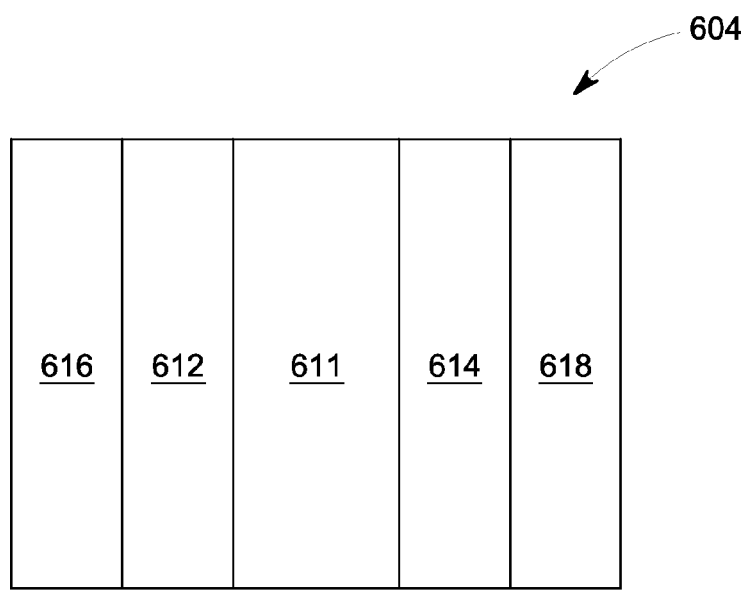
FIG. 7 is a schematic representation of a dematching layer in accordance with an embodiment.

FIG. 7 is a schematic representation of a view of the dematching layer 604 shown in FIG. 6. FIG. 7 is a bottom view and it shows that the first region 611, the second region 612, the third region 614, the fourth region 616, and the fifth region 618 are each 2D regions or surfaces. The transition regions are not visible in FIG. 7.

Figure 8:
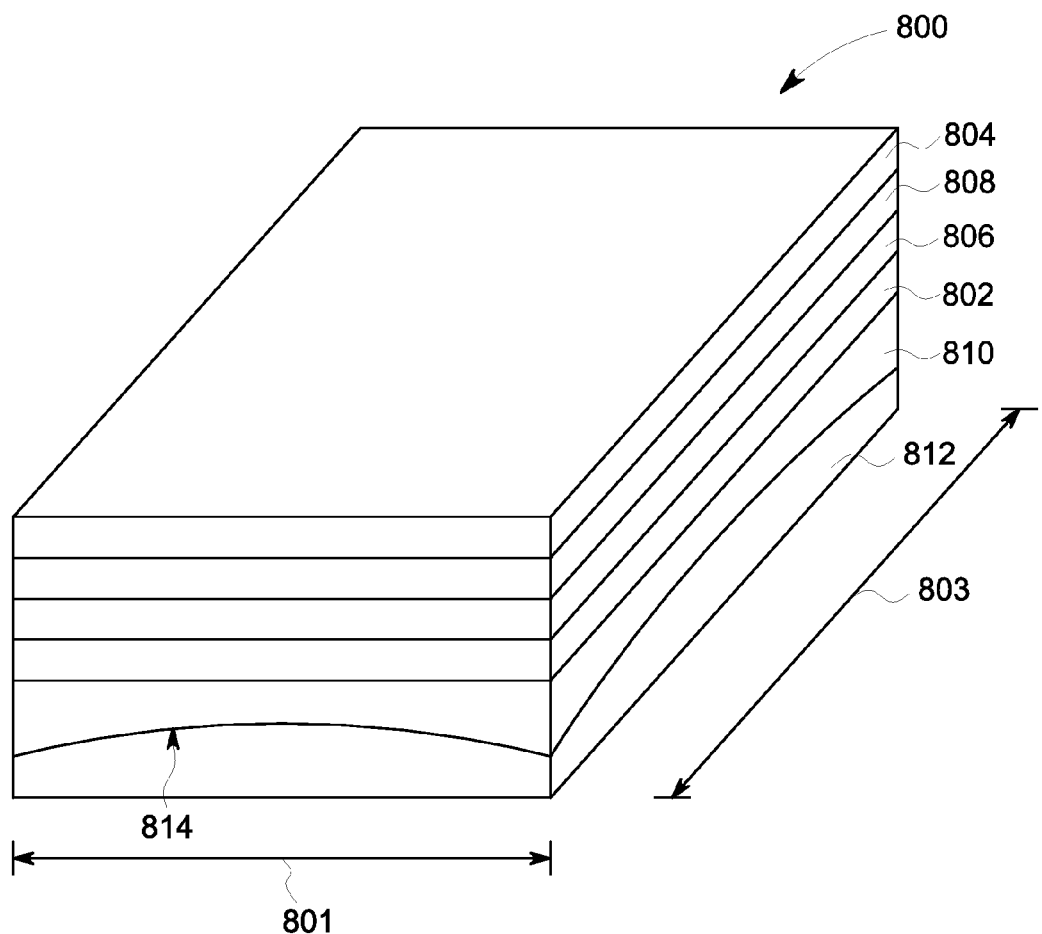
FIG. 8 is a schematic representation of a perspective view of an ultrasound transducer in accordance with an embodiment.

FIG. 8 is a schematic representation of a perspective view of an ultrasound transducer 800 in accordance with an embodiment. The ultrasound transducer 800 includes an acoustic layer 802. The acoustic layer 802 includes a plurality of transducer elements arranged in a 2D array. Transducer 800 is an E4D transducer with full beamsteering in both a width direction 801 and a length direction 803. According to an embodiment, the acoustic layer 802 may be a common dimension in both the width direction 801 and the length direction 803. The transducer 800 includes an acoustic lens 804. The transducer 800 includes a first matching layer 806 attached to the acoustic layer 802 and a second matching layer 808 attached to the first matching layer 806 and the lens 804. The transducer 800 includes a dematching layer 810 attached to the acoustic layer 802. The transducer 800 also includes a base 812 connected to the dematching layer 810.

The dematching layer 812 varies in thickness in both the width direction 801 and the length direction 803. In other words, the dematching layer 812 does not have a constant cross-section along the width direction 801. The dematching layer 812 may be shaped so that a backside 814 defines a concave surface. According to an embodiment, the concave surface may include a bowl-shaped recessed region with a constant radius of curvature in all directions. According to other embodiment, the radius of curvature of the concave surface may vary based on the direction. For example, the dematching layer 812 may be shaped to define a first radius of curvature in the width direction 801 and a second, different, radius of curvature in the length direction 803. The dematching layer may vary in thickness in other ways according to other embodiments. For example, the thickness of the dematching layer may vary according to a curve in one or more direction and the thickness may vary according to a step function in one or more direction. The dematching layer may be shaped to define a compound curve including a radius of curvature that varies and the dematching layer may be shaped to define a backside surface with including a plurality of surfaces disposed at different angles with respect to each other. The number and orientations of these surfaces may vary depending upon the embodiment. However, for most embodiments, it is envisioned that the thickness will be thinner at a center location than at one or more of the edge locations. Additionally, for embodiments where the transducer elements are arranged in a 2D array, it may be desirable to have the dematching layer change in thickness in a manner that is the same in both the width direction 801 and the length direction 803.

Figure 9:
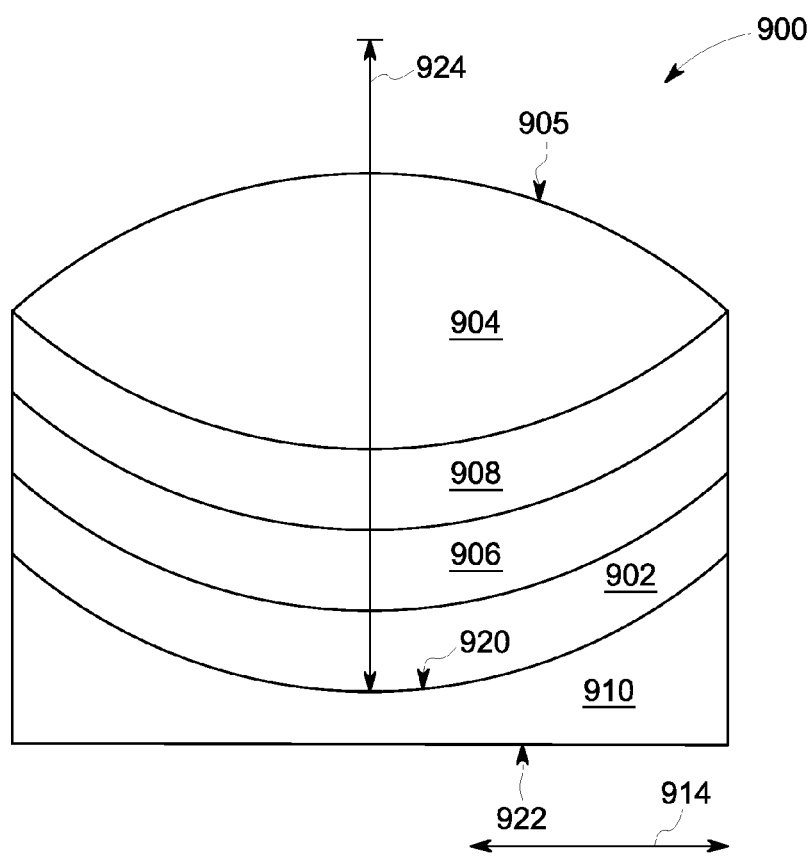
FIG. 9 is a schematic representation of a sectional view of an ultrasound transducer in accordance with an embodiment.

FIG. 9 is a schematic representation of a sectional view of an ultrasound transducer 900 in accordance with an embodiment. The ultrasound transducer 900 may be a component of an ultrasound imaging system, such as the ultrasound imaging system 100 (shown in FIG. 1). For example, the transducer 900 may replace transducer 106 in the ultrasound imaging system 100. Transducer 900 includes an acoustic layer 902, which may include a plurality of transducer elements. According to an embodiment, the transducer elements may be a piezoelectric material such as lead zirconate titanate (PZT), a piezoelectric single crystal (such as PMN-PT or PIN-PMN-PT), or a piezocomposite material. According to the embodiment shown in FIG. 9, the acoustic elements may be arranged in a linear array. However, according to other embodiments, the transducer elements may be arranged in different configurations including a 2D array, such as in an E4D transducer. Transducer 900 includes a lens 904, a first matching layer 906, a second matching layer 908, and a dematching layer 910. The lens 904 includes a lens surface 905 that would contact the patient when acquiring ultrasound data. The first matching layer 906 and the second matching layer 908 are disposed between the acoustic layer 902 and the lens 904. The first matching layer 906 is coupled to the acoustic layer 902 and the second matching layer 908. The second matching layer 908 is coupled to the first matching layer 906 and the lens 904. The dematching layer 910 is coupled to the acoustic layer 902 on the opposite side as the matching layers and the lens 904. According to an embodiment, the components shown in FIG. 9 may be coupled together with epoxy or another adhesive. As such, there may be a very thin layer of epoxy or another adhesive between the layers represented in FIG. 9.

According to an embodiment, the acoustic layer 902 may be PZT, a piezoelectric single crystal, or a piezocomposite. According to an embodiment, the acoustic layer 902 may have a relatively high acoustic impedance of about 30 MRayl. However, in order to maximize the transmission of acoustic energy into the tissue, matching layers 906, 908 are disposed between the lens 904 and the acoustic layer 902. The matching layers 906, 908 are selected to minimize the amount of acoustic energy that is reflected back from boundaries between layers with different acoustic impedances in the transducer 900. Each of the matching layers may include: a metal, such as copper, copper alloy, copper with graphite pattern embedded therein, magnesium, magnesium alloy, aluminum, aluminum alloy; filled epoxy; glass ceramic; composite ceramic; and/or macor, for example. The matching section may include a mass layer and a spring layer. The lens 904 may be rubber or any other material with a different speed of sound than the tissue being imaged with the ultrasound. The lens 904 may adapted to shape and focus the ultrasound beam emitted from the acoustic layer 902. The material used to form the lens 904 may be selected to closely match the acoustic impedance of the human body. Matching layers 906, 908 provide a combined distance of x between lens 904 and acoustic layer 902, where the distance x is about ¼ to ½ of the desired wavelength of transmitted ultrasound waves at the resonant frequency.

The dematching layer 910 includes a front side 920 adjacent to the acoustic layer 902 and a backside 922 opposite of the acoustic layer 902. The front side 920 defines a curved surface. For example, dematching layer 910 is shaped so that the front side 920 shown in FIG. 9 defines a concave surface. The front side 920 may define a curved surface with a radius of curvature 924 according to an embodiment. The radius of curvature 924 of the embodiment shown in FIG. 9 is 100 mm, but other embodiments may have a different radius of curvature. For example, the radius of curvature 924 of the curved surface 920 may range from 10 mm to 500 mm according to other embodiments. Additionally, other embodiment may have a dematching layer defining a curved surface with something other than a fixed radius of curvature. For example, other embodiments may have dematching layers shaped so the front side of the dematching layer defines a curved surface of a different shape. For example, the curved surface may have a cross section shaped like a different type of conic section, such as a parabola or an ellipse. Additionally, while the cross-section of the dematching layer 910 shown in FIG. 9 has a constant cross-section in the width direction 914, in other embodiments, the dematching layer 910 may define a curved surface with a cross-section that varies at different locations in a length direction (perpendicular to the width direction 914). It should be appreciated that the curved surface may be curved in different manners, such as according to curve with a varying radius of curvature that is not a conic section, according to other embodiments. Additionally, the acoustic layer 902, the first matching layer 906, and the second matching layer 908 may all be shaped to match the curvature defined by the front side 920 of the dematching layer 910. For example, in the embodiment shown in FIG. 9, the acoustic layer 910, the acoustic layer 902, the first matching layer 906, and the second matching layer 908 are all curved with a radius of curvature that mates with the radius of curvature of the front side 920. It may be generally desirable to have the acoustic layer 902, the first matching layer 906, and the second matching layer 908 to be of a generally constant thickness in a direction perpendicular to the front side 920 of the dematching layer. As such, for embodiments where the front side 920 of the dematching layer 910 defines a different type of curve, such as a parabola or an ellipse, the acoustic layer 902, the first matching layer 906, and the second matching layer 908 may all be curved in a generally parabolic manner or in a generally elliptical manner respectively. Additionally, the lens 904 may be shaped slightly differently in order to conform to differently shaped matching layers 906, 908. For example, the lens can have a flat surface or a convex surface which is in direction contact with the patient while scanning. As stated previously, various embodiments may include either a greater or a fewer number of matching layers 906, 908.

The backside 922 of the dematching layer 910 may define a flat surface according to the embodiment shown in FIG. 9. According to other embodiments that will be described hereinafter, the backside 922 may also define a curved surface. FIG. 9 is a cross-sectional view of the transducer 106 along a width direction 914. The width direction 914 will be described in additional detail with respect to FIG. 10.

The variable thickness of the dematching layer 910 functions to increase the bandwidth of the transducer 900 for a given center frequency in a manner similar to that which was previously described with respect to FIG. 4. Additionally, the dematching layer 910 is shaped so that the front side 920 defines a curved surface. The acoustic layer 902 is attached to the curved surface of the backside matching layer 910 so that the acoustic layer 902 matches the curved surface. Additionally, the first matching layer 906 and the second matching layer 908 are both curved to match the curved surface. Since the acoustic layer 902 is shaped to match the curved surface, which is a concave surface according to an embodiment, the transducer elements in the acoustic layer 902 naturally provide a focusing effect for the ultrasound transducer 900 by emitting ultrasound beams that converge to a focal point or region. The curved acoustic layer 902 allows for an appropriate level of focusing with less reliance on the acoustic shaping provided by other layers, such as the lens 904. It is therefore possible to use a thinner lens 904 which results in less attenuation of the transmitted and received ultrasound signals. This, in turn, results in a stronger signal-to-noise ratio for the ultrasound transducer 900.

Figure 10:
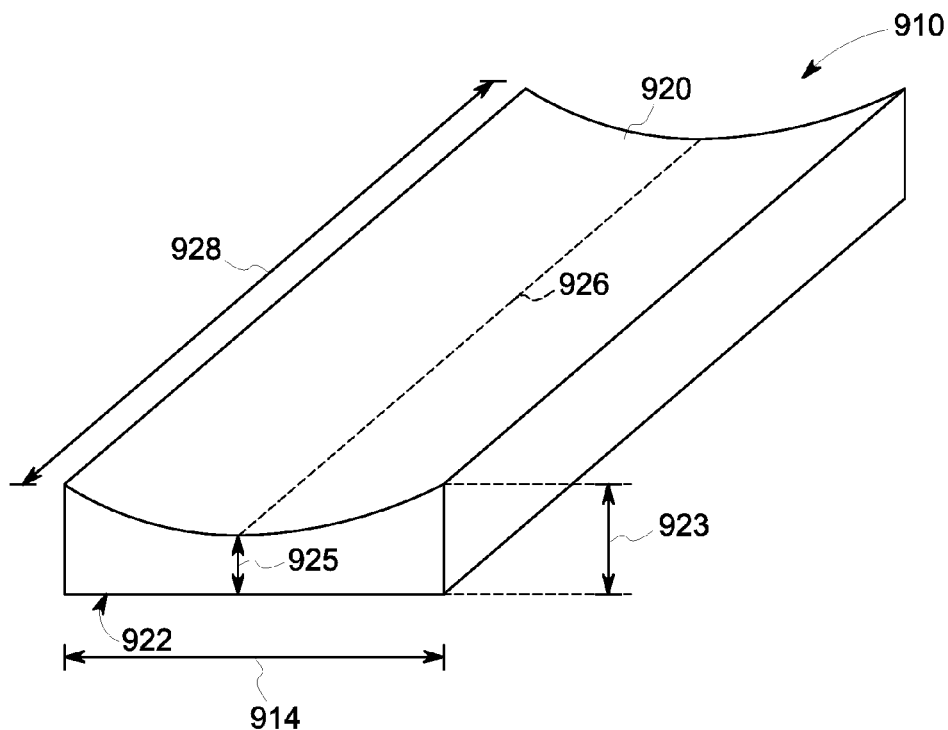
FIG. 10 is a schematic representation of a perspective view of a dematching layer in accordance with an embodiment.

FIG. 10 is a schematic representation of a perspective view of the dematching layer 910 from FIG. 2 in accordance with an embodiment. The dematching layer 910 includes a length direction 928 and the width direction 914. As is visible in FIG. 10, the dematching layer 910 is longer in the length direction 928 than the width direction 914. The front side 920 and the backside 922 are also represented in FIG. 10. The dematching layer 910 is shaped so that the front side 920 defines a concave surface. According to an embodiment, the dematching layer 910 is a shape with a constant cross-section in the width direction 914. Dimensions of the dematching layer 910 will be described in accordance with an exemplary embodiment. According to an embodiment, the dematching layer 910 is part of a transducer 900 (shown in FIG. 9) where the acoustic layer 902 (shown in FIG. 9) is configured as a linear array. The elements of the linear array are arranged along the length direction 928. The dematching layer 910 is formed from a material with a higher acoustic impedance compared to the acoustic layer 902. The dematching layer 910 may be, for example, tungsten carbide, which has an acoustic impedance of about 100 MRayl. The dematching layer 910 could be made from any other material with an acoustic impedance that is significantly higher than that of the acoustic layer 902. According to an exemplary embodiment, the dematching layer 910, may be sintered from a powder into a rough shape and then machined into a final shape with more precise dimensions. For example, the dematching layer 910 may be sintered into a generally flat layer and then the shape and dimensions of the backside 922 and front side 920 may be finalized during a machining step. According to an exemplary embodiment, the dematching layer 910 may be 28 mm in the length direction 928, and 15 mm in the width direction 914. The dematching layer 910 may be 0.31 mm in thickness at an edge, as indicated by an edge thickness 923, and 0.15 mm at a center, as indicated by a center thickness 925. A centerline 926 is represented by a dashed line on FIG. 3. The centerline 926 is in the middle of the dematching layer 910 in the width direction 914. For purposes of this disclosure the term "center" will be defined to include locations along the centerline of the dematching layer 910. According to an embodiment, the dematching layer 910 is shaped so that the front side 920 defines a concave surface. The concave surface of the embodiment shown in FIG. 10 has a constant radius of curvature of 100 mm. However, it should be appreciated that other embodiments may be shaped differently. For example, other embodiments may include a dematching layer with a concave surface with a variable radius of curvature. That is, the front side of the dematching layer may define a complex curve including multiple different radii of curvature.

Figure 11:
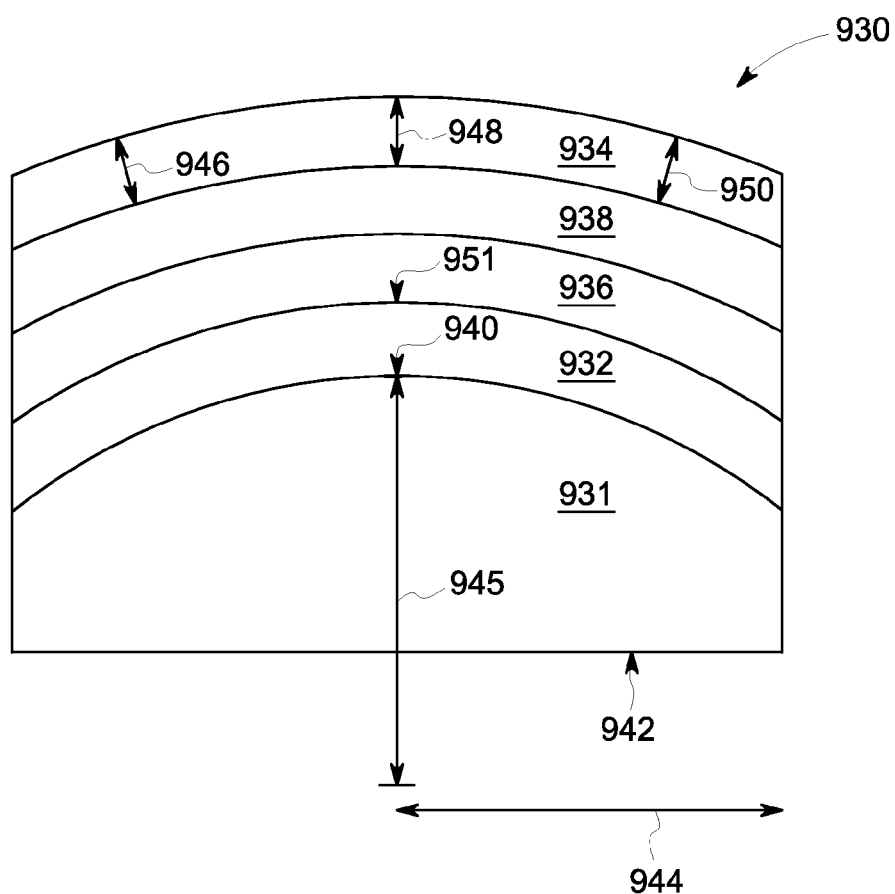
FIG. 11 is a schematic representation of a sectional view of an ultrasound transducer in accordance with an embodiment.

FIG. 11 is a schematic representation of a sectional view of an ultrasound transducer 930 in accordance with an embodiment. Ultrasound transducer 930 includes a dematching layer 931, an acoustic layer 932, a first matching layer 936, a second matching layer 938, and a lens 934. Other embodiments may only have a single matching layer, or they may have three or more matching layers. The transducer 930 may be a component of an ultrasound imaging system, such as the ultrasound imaging system 100

(shown in FIG. 1). For example, the transducer 930 may replace transducer 106 in the ultrasound imaging system 100. Transducer 930 includes an acoustic layer 932, which may include a plurality of transducer elements. Transducer 930 includes a lens 934, a first matching layer 936, a second matching layer 938, and a dematching layer 931. The first matching layer 936 and the second matching layer 938 are disposed between the acoustic layer 931 and the lens 934. The first matching layer 936 is coupled to the acoustic layer 932 and the second matching layer 938. The second matching layer 938 is coupled to the first matching layer 936 and the lens 934. The dematching layer 931 is coupled to the acoustic layer 932 on the opposite side as the matching layers and the lens 934. According to an embodiment, the components shown in FIG. 9 may be coupled together with epoxy or another adhesive. As such, there may be a very thin layer of epoxy or another adhesive between the layers represented in FIG. 11.

According to an embodiment, the acoustic layer may include PZT, a piezoelectric single crystal (such as PMN-PT or PIN-PMN-PT), or a piezocomposite. However, in order to maximize the transmission of acoustic energy into the tissue, matching layers 936, 938 are disposed between the lens 934 and the acoustic layer 932. The matching layers 936, 938 are selected to minimize the amount of acoustic energy that is reflected back from boundaries between layers with different acoustic impedances in the transducer 930. Each of the matching layers may include: a metal, such as copper, copper alloy, copper with graphite pattern embedded therein, magnesium, magnesium alloy, aluminum, aluminum alloy; filled epoxy; glass ceramic; composite ceramic; and/or macor, for example. The lens 934 may be rubber or any other material with a different speed of sound than the tissue being imaged with the ultrasound. The lens 934 may also be of generally uniform thickness so as not to provide a focusing effect on the ultrasound waves. The material used to form the lens 934 may be selected to closely match the electrical impedance of the human body. Matching layers 936, 938 provide a combined distance of x between lens 934 and acoustic layer 932, where the distance x is about ¼ to ½ of the desired wavelength of transmitted ultrasound waves at the resonant frequency.

The dematching layer 931 includes a front side 940 adjacent to the acoustic layer 932 and a backside 942 opposite of the acoustic layer 932. The front side 940 defines a curved surface. For example, dematching layer 910 is shaped so that the front side 940 shown in FIG. 11 defines a convex surface. The front side 940 may define a curved surface with a radius of curvature 945 according to an embodiment. The radius of curvature 945 of the embodiment shown in FIG. 11 is 100 mm, but other embodiments may have a different radius of curvature. For example, the radius of curvature 945 of the curved surface 920 may range from 10 mm to 500 mm according to other embodiments. Additionally, other embodiment may have a dematching layer defining a curved surface with something other than a fixed radius of curvature. For example, other embodiments may have dematching layers shaped so the front side of the dematching layer defines a curved surface of a different shape. For example, the curved surface may have a cross section shaped like a different type of conic section, such as a parabola or an ellipse. Additionally, while the cross-section of the dematching layer 931 shown in FIG. 11 has a constant cross section in the width direction 944, in other embodiments, the dematching layer 931 may define a curved surface with a cross-section that varies at different locations in a length direction (perpendicular to the width direction 944). It should be appreciated that the curved surface may be curved in different manners, such as according to curve with a varying radius of curvature that is not a conic section, according to other embodiments. Additionally, the acoustic layer 932, the first matching layer 936, and the second matching layer 938 may all be shaped to match the curvature defined by the front side 940 of the dematching layer 931. For example, in the embodiment shown in FIG. 11, the acoustic layer 932, the first matching layer 936, and the second matching layer 938 are all shaped with a radius of curvature that matches or mates with the radius of curvature defined by the front side 940. It may be generally desirable to have the acoustic layer 932, the first matching layer 936, and the second matching layer 938 to be of a generally constant thickness in a direction perpendicular to the front side 940 of the dematching layer. As such, for embodiments where the front side 940 of the dematching layer 931 defines a different type of curve, such as a parabola or an ellipse, the acoustic layer 932, the first matching layer 936, and the second matching layer 938 may all be curved in a generally parabolic manner or in a generally elliptical manner respectively. Additionally, the lens 934 may be shaped slightly differently in order to conform to the second matching layer 938. As stated previously, various embodiments may include either a greater or a fewer number of matching layers 936, 938.

The backside 942 of the dematching layer 931 may define a flat surface according to the embodiment shown in FIG. 11. Having the backside 942 of the dematching layer 931 define a flat surface is beneficial because it allows for a flex circuit (not shown) or other component to be more easily attached to the dematching layer 931. For example, as a manufacturing process, it is much easier to laminate or bond a flex circuit or any other component to a flat surface, such as the backside 942, than to a curved surface, such as either a concave or a convex surface. In addition, the flat surface of the dematching layer 931 allows for an easier manufacturing process when attaching an electrical component, such as an ASIC, to the backside 942 of the dematching layer 931. The electrical component may, for instance, be bonded or otherwise attached to the backside of the dematching layer 931. This is particularly advantageous when manufacturing 2D transducers or E4D transducers.

The variable thickness of the dematching layer 931 functions to increase the bandwidth of the transducer for a given center frequency in a manner similar to that which was previously described with respect to FIG. 4. The dematching layer 931 is shaped so that the front side 940 defines a curved surface. The acoustic layer 932 is attached to the curved surface of the backside matching layer 931 so that the acoustic layer 932 matches the curved surface. Additionally, the first matching layer 936 and the second matching layer 938 are both curved to match the curved surface. According to an embodiment, the lens 934 may be shaped to match the curve defined by the front side 940 of the dematching layer 931. The lens 934 may also comprise a shape with a generally uniform thickness. For example, the lens 934 comprises a shape with a generally uniform thickness at location 946, location 948, and location 950 as measured in a direction normal to a front side 951 of the acoustic layer 932. From the perspective of ergonomics, it is generally desirable to have an ultrasound transducer with a convex lens surface in the elevation direction. Having a convex surface makes it easier to obtain good patient contact, which results in better acoustic coupling between the ultrasound transducer and the patient's tissue. For most conventional probes, this typically results in a lens that is thicker in the center than in the edge regions. The conventional design results in additional and unnecessary attenuation of the ultrasound signals, since the signals are naturally attenuated more as they pass through the thicker portions of the lens material. In contrast, in the embodiment shown in FIG. 11, the lens 934 is a uniform thickness. Since it is not necessary to have a thicker center portion of the lens in order to obtain a convex lens surface, it is possible for the lens 934 to be thinner than in a conventional ultrasound transducer. This, in turn, results in a stronger signal-to-noise ratio for the ultrasound transducer 930.

Figure 12:
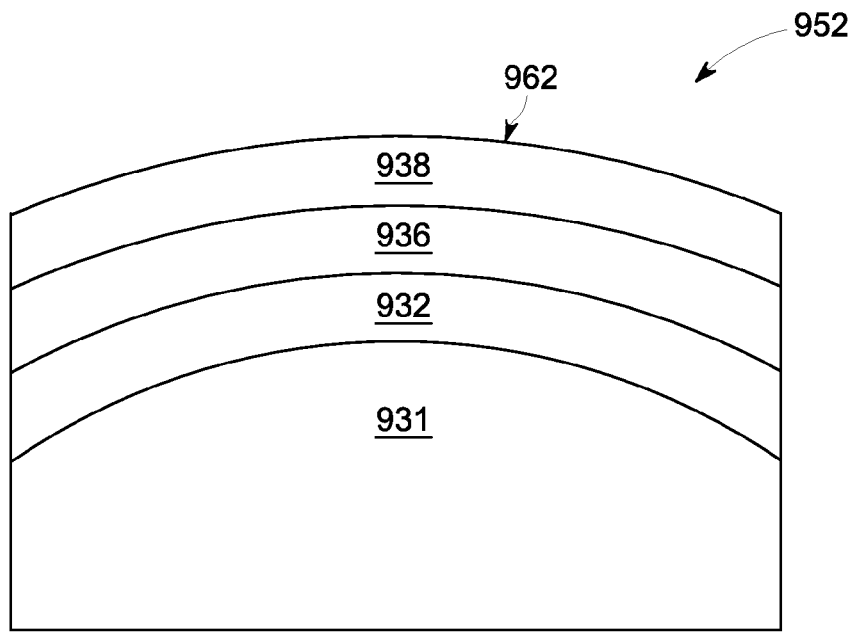
FIG. 12 is a schematic representation of a sectional view of an ultrasound transducer in accordance with an embodiment.

FIG. 12 is a schematic representation of an ultrasound transducer 952 in accordance with an embodiment. Some of the elements schematically represented in FIG. 12 are the same as elements that were schematically represented in FIG. 11. Common reference numbers are used to identify identical elements between FIGS. 11 and 12.

The ultrasound transducer 952 includes the dematching layer 931, the acoustic layer 932, the first matching layer 936, and the second matching layer 938. The dematching layer 931, the acoustic layer 932, the first matching layer 936, and the second matching layer 938 were previously described with respect to FIG. 11 and will not be described again with respect to FIG. 12. The ultrasound transducer 952 shown in FIG. 12 does not include a lens. The second matching layer 938 is configured to be placed in direct contact with the patient. As in the embodiment described with respect to FIG. 12, the second matching layer 938 is curved so that an outer surface 962 is convex. The outer surface 962 is convex to ensure good patient contact and strong acoustic coupling. By not requiring a lens, ultrasound signals from the acoustic layer 932 have less material to travel through before reaching patient. Less material results in less attenuation and a stronger signal-to-noise ratio than conventional ultrasound transducers including a lens.

Figure 13:
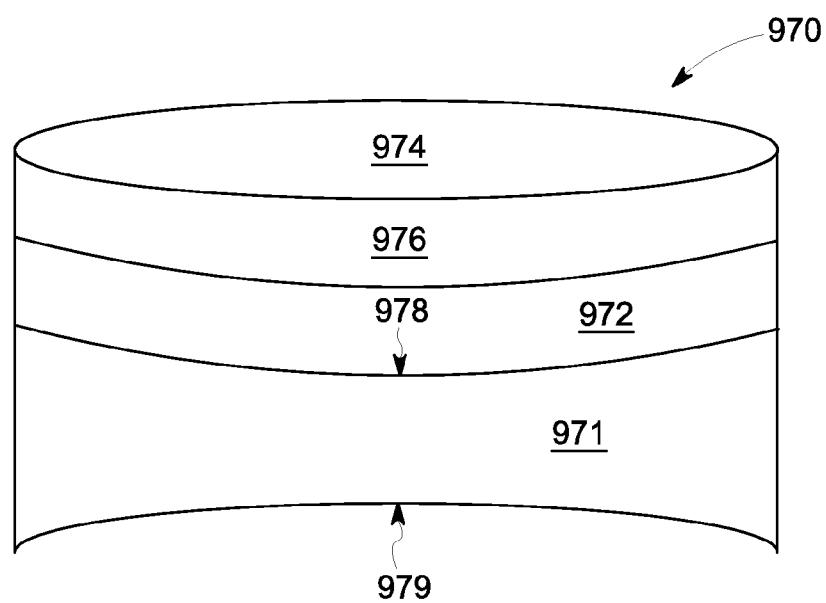
FIG. 13 is a schematic representation of a sectional view of an ultrasound transducer in accordance with an embodiment.

FIG. 13 is a schematic representation of an ultrasound transducer 970 in accordance with an embodiment. The ultrasound transducer 970 includes a dematching layer 971, an acoustic layer 972, a matching layer 976 and a lens 974. The dematching layer 971 is shaped so that a front side 978 defines a curved surface and so that a backside 979 defines a curved surface. In the embodiment shown in FIG. 13, the front side 978 defines a concave surface and the backside 979 defines a concave surface. However, it should be appreciated that the dematching layer 971 may be shaped so that either the front side 978 or the backside 979 defines either a concave surface or a convex surface. For example, the front side 978 may be either concave or convex and the backside 979 may be either concave or convex. It may be advantageous to have both the front side 978 and the backside 979 of the dematching layer 971 define curved surfaces because it may be possible to increase the bandwidth for the transducer 970 (compared to a conventional flat dematching layer) while having a less aggressively curved front side 978 compared to an ultrasound transducer with only one of the front side 978 and the backside 979 defining a curved surface. Since the curvature of the acoustic layer 972 determines the focus of the elements in the acoustic layer, and the acoustic layer 972 matches the curvature of the front side 978 of the dematching layer 971 according to many embodiments, the ability to control the curvature of both the front side 978 and the backside 979 gives designers additional flexibility to control the focus of the ultrasound transducer 970 while still benefitting from the advantages of wider bandwidth for the ultrasound transducer 970.

As in the previously described embodiments, the dematching layer 971 may be, for example, tungsten carbide, which has an acoustic impedance of about 100 MRayl. The dematching layer 971 could be made from any other material with an acoustic impedance that is significantly higher than that of the acoustic layer 972. According to an exemplary embodiment, the dematching layer 971 may be sintered from a powder into a rough shape and then machined into a final shape with more precise dimensions. The acoustic layer 972 is similar in shape, structure, and function to the acoustic layer 902 shown in FIG. 9 and will therefore not be described in additional detail. The ultrasound transducer 970 includes only a single matching layer 976. Other embodiments may include two or more separate matching layers. The lens 974 is similar to the lens 904 described with respect to FIG. 9 and will not be described in additional detail.

Figure 14:
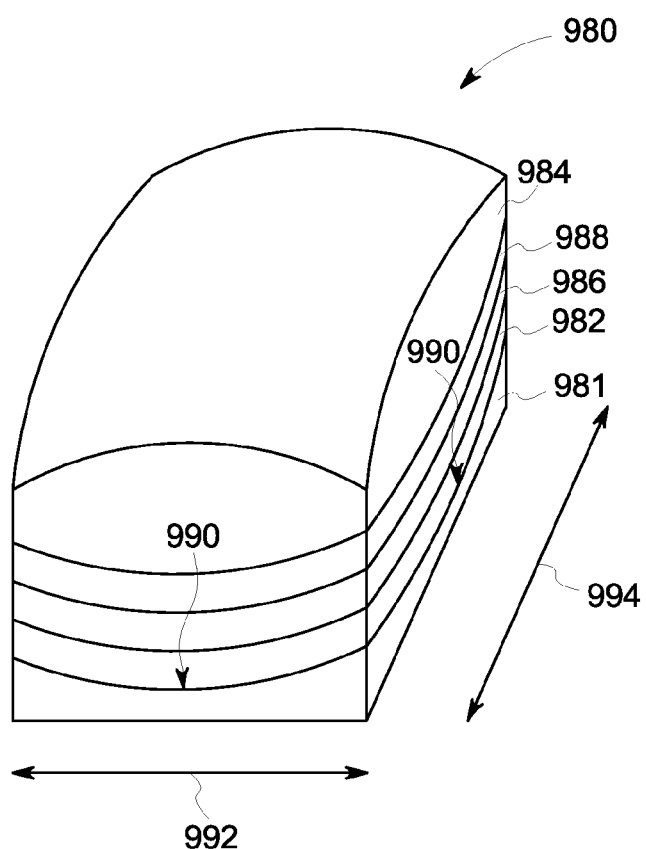
FIG. 14 is a schematic representation of a perspective view of an ultrasound transducer in accordance with an embodiment.

FIG. 14 is a schematic representation of a perspective view of an ultrasound transducer 980 in accordance with an embodiment. The ultrasound transducer 980 includes an acoustic layer 982. The acoustic layer 982 includes a plurality of transducer elements arranged in a 2D array. Transducer 980 is an E4D transducer with full beamsteering in both a width direction 992 and a length direction 994. According to an embodiment, the acoustic layer 982 may be a common dimension in both the width direction 992 and the length direction 994. The transducer 980 includes an acoustic lens 984. The transducer 980 includes a first matching layer 986 attached to the acoustic layer 982 and a second matching layer 988 attached to the first matching layer 986 and the lens 984. The transducer 980 includes a dematching layer 981 attached to the acoustic layer 982.

The dematching layer 981 varies in thickness in both the width direction 992 and the length direction 994. In other words, the dematching layer 981 does not have a constant cross-section along the width direction 992. The dematching layer 981 may be shaped so that a front side 990 defines a concave surface. According to an embodiment, the concave surface may include a bowl-shaped recessed region with a constant radius of curvature in all directions. According to other embodiment, the radius of curvature of the concave surface may vary. For example, the dematching layer 981 may be shaped to define a first radius of curvature in the width direction 992 and a second, different, radius of curvature in the length direction 994. The dematching layer 981 may vary in thickness in other ways according to other embodiments. The dematching layer 981 may be shaped so the front side 990 defines a compound curve including a radius of curvature that varies. For example, the front side 990 may define a curve such as a parabola or an ellipse. While the front side 990 defines a concave surface according to the embodiment shown in FIG. 14, the dematching layer 981 may be shaped so the front side 990 defines a convex surface according to other embodiments. Additionally, for embodiments where the transducer elements are arranged in a 2D array, it may be desirable to have the dematching layer 981 change in thickness in a manner that is the same in both the width direction 992 and the length direction 994.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An ultrasound transducer comprising:
   an acoustic layer including a plurality of transducer elements; and
   a dematching layer coupled to the acoustic layer, the dematching layer comprising a front side adjacent to the acoustic layer and a backside opposite of the acoustic layer, the dematching layer having a greater acoustic impedance than the acoustic layer, the dematching layer having a thickness that varies in order to alter a bandwidth of the ultrasound transducer, wherein the front side of the dematching layer defines a curved surface.

2. The ultrasound transducer of claim 1, wherein the backside of the dematching layer defines a substantially flat surface.

3. The ultrasound transducer of claim 1, wherein the backside of the dematching layer defines a second curved surface.

4. The ultrasound transducer of claim 1, wherein the curved surface comprises a convex surface, and wherein the acoustic layer is curved to match the convex surface.

5. The ultrasound transducer of claim 1, wherein the curved surface comprises a concave surface and the acoustic layer is curved to match the concave surface, and wherein the dematching layer and the acoustic layer provides a focusing effect for the ultrasound transducer.

6. The ultrasound transducer of claim 5, wherein the ultrasound transducer does not include a lens.

7. The ultrasound transducer of claim 5, further comprising a lens and one or more matching layers, wherein the one or more matching layers are attached to the acoustic layer and the lens is attached to the one or more matching layers, wherein the lens comprises a substantially uniform thickness.

8. The ultrasound transducer of claim 1, wherein the dematching layer comprises a shape with a length direction and a width direction, wherein the dematching layer is longer in the length direction than the width direction, and wherein the thickness varies along the width direction.

9. The ultrasound transducer of claim 1, wherein the curved surface has a radius of curvature that is between 10 mm and 500 mm.

10. An ultrasound imaging system comprising:
    an ultrasound transducer for transmitting and receiving ultrasound signals, wherein the ultrasound transducer comprises an acoustic layer including a plurality of transducer elements, and
    a dematching layer coupled to the acoustic layer, the dematching layer comprising a front side and a backside, the dematching layer having a greater acoustic impedance than the acoustic layer, the dematching layer having a thickness that varies in order to alter a bandwidth of the ultrasound transducer, wherein the front side of the dematching layer defines a curved surface.

11. The ultrasound imaging system of claim 10, wherein the dematching layer comprises a shape with a length direction and a width direction, wherein the dematching layer is longer in the length direction than the width direction, and wherein the thickness varies in the width direction.

12. The ultrasound imaging system of claim 10, wherein the thickness of the dematching layer is less at a center than at an edge in the width direction.

13. The ultrasound imaging system of claim 10, wherein the thickness of the dematching layer is greater at a center than at an edge in the width direction.

14. The ultrasound imaging system of claim 10, wherein the dematching layer increases the bandwidth of the ultrasound transducer by at least 10% compared to a conventional dematching layer with the same acoustic impedance and a uniform thickness.

15. The ultrasound imaging system of claim 10, wherein the curved surface is curved according to a constant radius of curvature.

16. The ultrasound imaging system of claim 10, wherein the curved surface is curved according to a parabolic curve or an elliptical curve.

17. The ultrasound imaging system of claim 10, wherein the backside of the dematching layer defines a substantially flat surface.

18. The ultrasound imaging system of claim 10, wherein the backside of the dematching layer defines a second curved surface.

19. The ultrasound imaging system of claim 10, wherein the curved surface comprises a concave surface.

20. The ultrasound imaging system of claim 10, wherein the curved surface comprises a convex surface.

* * * * *